(12) United States Patent
Meidl

(10) Patent No.: US 8,740,502 B2
(45) Date of Patent: Jun. 3, 2014

(54) ANCHOR AND ANCHOR NUT THEREOF

(75) Inventor: Michael Meidl, Seeboden (AT)

(73) Assignee: Atlas Copco MAI GmbH, Feistritz an der Drau (AT)

( * ) Notice: Subject to any disclaimer, the term of this patent is extended or adjusted under 35 U.S.C. 154(b) by 254 days.

(21) Appl. No.: 12/530,686

(22) PCT Filed: Jan. 17, 2008

(86) PCT No.: PCT/AT2008/000013
§ 371 (c)(1),
(2), (4) Date: Sep. 10, 2009

(87) PCT Pub. No.: WO2008/109895
PCT Pub. Date: Sep. 18, 2008

(65) Prior Publication Data
US 2010/0034596 A1  Feb. 11, 2010

(30) Foreign Application Priority Data

Mar. 12, 2007  (AT) .................................. A 391/2007

(51) Int. Cl.
*E21D 20/00*  (2006.01)
(52) U.S. Cl.
USPC .......................................... 405/259.1; 411/1
(58) Field of Classification Search
USPC ..................... 405/259.1–259.6; 411/1, 3, 5, 8
See application file for complete search history.

(56) References Cited

U.S. PATENT DOCUMENTS

| 3,979,918 A | 9/1976 | Vidler |
| 4,662,795 A | 5/1987 | Clark |
| 5,143,499 A | 9/1992 | Bobo et al. |
| 6,619,888 B2 * | 9/2003 | Calandra et al. ........... 405/259.6 |
| 8,007,206 B1 * | 8/2011 | Spearing .................... 405/259.1 |
| 2001/0026746 A1 | 10/2001 | Calandra |
| 2005/0123360 A1 * | 6/2005 | Mongrain .................. 405/259.1 |

FOREIGN PATENT DOCUMENTS

| DE | 2746073 A1 | 4/1979 |
| DE | 3342917 A1 | 5/1985 |
| EP | 0661465 A1 | 7/1995 |

(Continued)

OTHER PUBLICATIONS

Search Report in corresponding Austrian Application A 391/2007 dated Sep. 13, 2007.

(Continued)

*Primary Examiner* — Sean Andrish
(74) *Attorney, Agent, or Firm* — Young & Thompson

(57) ABSTRACT

An anchor includes a rotatable anchor rod an anchor plate and an anchor nut. The screw thread in the anchor nut matches the screw thread of the anchor rod only over part of the screw thread hole. Thus the anchor nut can only be screwed some way further onto the anchor rod, and up to a predetermined torque can be used for rotating the anchor rod during placement of the anchor. As soon as the anchor rod is firmly seated in the drill hole, as a result of the action of adhesive, mortar or expansion or spreading, the anchor rod forms a through-thread in the screw thread hole when the anchor nut is rotated relative to the anchor rod, and consequently the anchor nut can finally be screwed onto the anchor rod until it affixes the anchor plate in its final position to the ground.

8 Claims, 3 Drawing Sheets

(56) References Cited

FOREIGN PATENT DOCUMENTS

| FR | 2 787 153 | 6/2000 |
|---|---|---|
| GB | 2158538 | 11/1985 |
| JP | H01182614 A | 7/1989 |
| JP | 2002168224 A | 6/2002 |
| JP | 2006189077 A | 7/2006 |

OTHER PUBLICATIONS

International Search Report dated May 30, 2008, in PCT application.
Korean Office Action dated May 23, 2012 in corresponding Korean application No. 2009-7019204 with English translation.
Translation of Interrogation dated Dec. 17, 2013, filed in the JP corresponding application.
Requisition dated Feb. 18, 2014, from corresponding CA application.

* cited by examiner

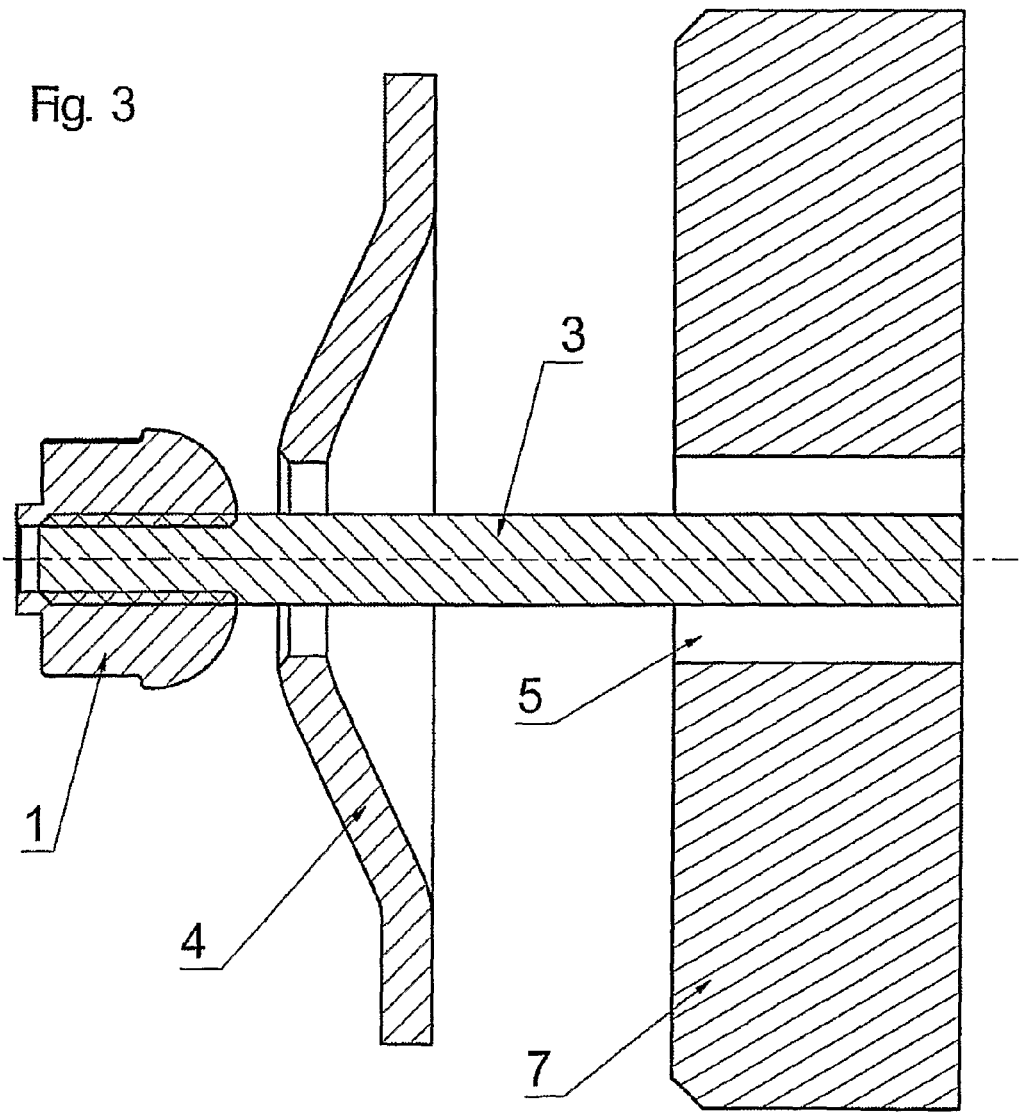

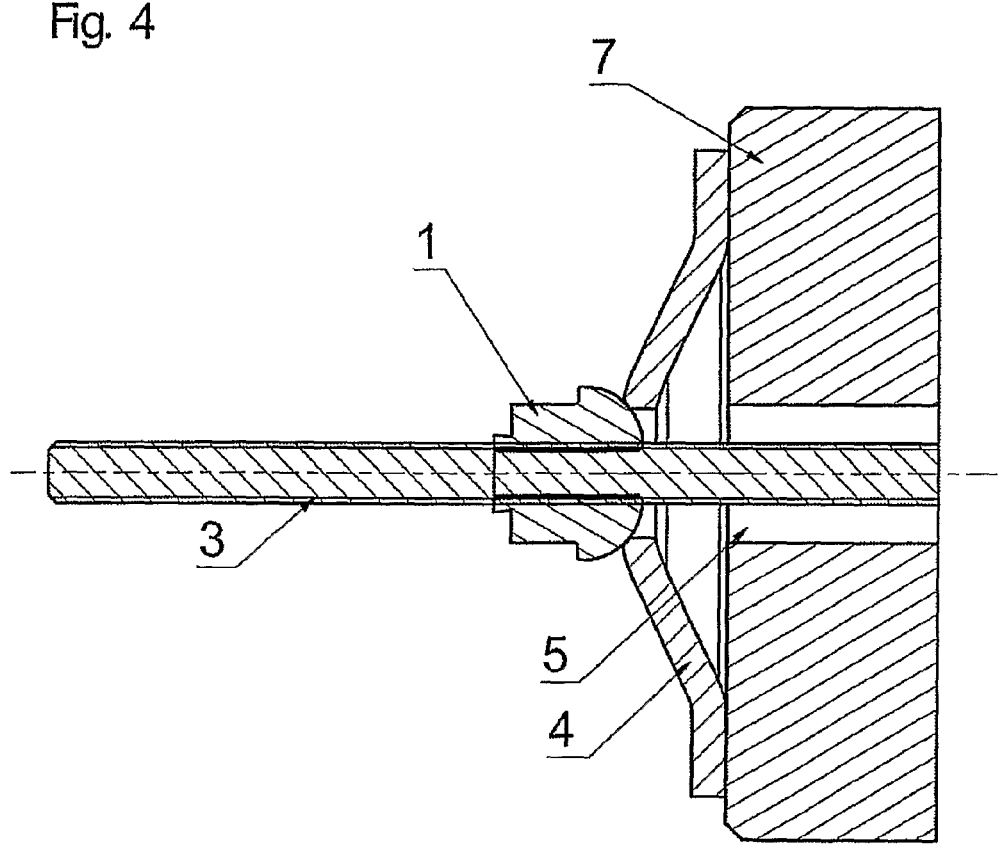

ANCHOR AND ANCHOR NUT THEREOF

CROSS-REFERENCE TO RELATED APPLICATIONS

The instant application claim benefit of priority to PCT/AT2008/000013 filed Jan. 17, 2008 and Austrian Application A 391/2007 filed Mar. 12, 2007.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION (1) Field of the Invention

The invention relates to an anchor. In particular, the invention relates to an anchor whose anchor rod during installation (placement) of the anchor needs to be rotated, as is, for example, the case with anchors embedded in adhesive, with anchors affixed by mortar, or with expansion bolt anchors.

(2) Description of Related Art Including Information Disclosed Under 37 CFR 1.97 and 1.98

The procedure for placing anchors embedded in adhesive is such that a hole is drilled into the ground in which the anchor is to be placed. Thereafter one or several cartridges containing adhesive are inserted in the drill hole in that they are either pushed into the drill hole by means of a ramrod or in that they are shot in by means of compressed air. As a rule, these cartridges comprise two-component adhesives whose components are stored in the cartridges so as to be spatially separate from each other, for example in concentric plastic capsules. After the at least one cartridge has been inserted into the drill hole, the anchor is pushed into said drill hole and is rotated. Rotation of the anchor, i.e. of the metal rod, preferably a steel rod with a rough surface or with a profiled surface (TOR-steels, screw-threaded rods), can be carried out by means of a drilling machine (support drilling machine or drilling device). In this arrangement the front end of the anchor is designed to destroy the cartridge containing the components of the adhesive, and to mix the two components of the adhesive so that curing of the adhesive commences.

The reaction time, in other words the time it takes for the adhesive to harden or cure, can be set as desired, from a few seconds to several minutes, by the selection of the components and their mixing ratio.

Instead of adhesive material, the cartridges can also comprise mortar, which, after it has hardened, affixes the anchor in the drill hole. Such mortar cartridges are porous (plastic) hoses that are placed in water and are then inserted into the drill hole like the adhesive cartridges.

Furthermore, anchors are known that are affixed in the drill hole in that part of the anchor rod or a part connected to the anchor rod are flared or spread open. For example, this includes slotted-wedge anchors, sliding-wedge anchors or expansion bolt anchors. For spreading open, an expansion body is moved by rotating the anchor rod.

These known anchors are associated with a problem in that in order to rotate the anchor rod (this can be a solid rod or a tube) by the end of said anchor rod, which end projects from the drill hole, activation means need to be applied which subsequently need to be removed as soon as the anchor is firmly seated in the drill hole as a result of the adhesive effect, the mortar or the expansion.

It is the object of the invention to make the aforesaid easier.

BRIEF SUMMARY OF THE INVENTION

According to the invention this object is met by an anchor that comprises the characteristics of claim 1.

Preferred and advantageous embodiments of the invention are objects of the subclaims.

Since in the anchor according to the invention the anchor nut that is to be affixed to the anchor anyway is used for rotating the anchor rod for opening the adhesive cartridge or mortar cartridge or for activating (axial adjustment) of the expansion body, considerable simplification is achieved because it is simply sufficient, after the anchor rod has been affixed, to screw the nut further onto the anchor until the anchor plate finally rests against the ground into which the anchor has been placed.

In principle the invention can be implemented in all types of anchors, including rock anchors, in which the anchor rod needs to be rotated in order to be affixed in the drill hole (by means of adhesive, mortar, spreading, expansion or similar).

BRIEF DESCRIPTION OF THE SEVERAL VIEWS OF THE DRAWINGS

Further details and features of the invention are provided in the following description of a preferred exemplary embodiment with reference to the drawings.

The following are shown:

FIG. 3 the situation during rotation of the anchor or anchor bar; and

FIG. 4 the final position of the anchor with the anchor bar, anchor plate and anchor nut.

DETAILED DESCRIPTION OF THE INVENTION

Figure 1:
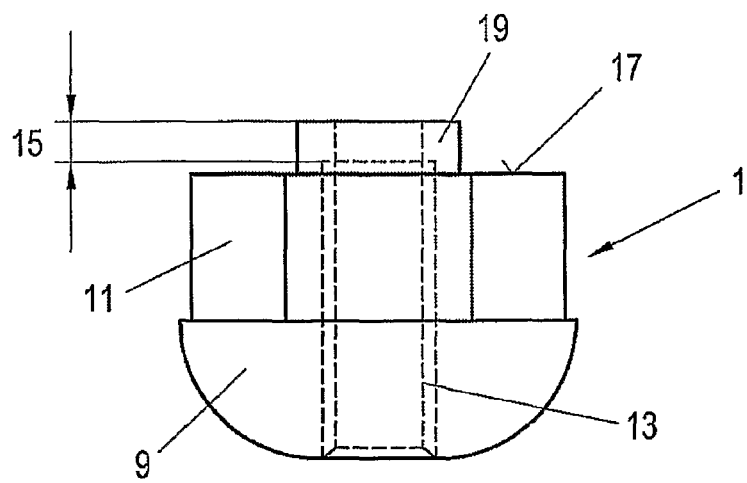
FIG. 1 a lateral view of an anchor nut.

From the state of the art it is known per se, during placement of anchors, for example during placement of anchors of the type of anchors that are embedded in adhesive or mortar anchors or expansion bolt anchors, to slide an anchor plate 4 onto the outer end of an anchor rod 3, which end projects above the ground 7 in which the anchor is placed, and subsequently to press this anchor plate 4 against the ground 7 by means of an anchor nut 1.

In the invention, the anchor nut 1 is also used for rotating the anchor rod 3 when it is used, with its front end that is received in the drill hole 5, to open an adhesive cartridge or a mortar cartridge that is arranged in the inner end of the drill hole 5, in order to release the adhesive/mortar and to mix it, or in the case of slotted-wedge anchors, sliding-wedge anchors, expansion bolt anchors and similar anchors in order to adjust an expansion body that is provided so as to be received at the front end, which is received in the borehole, of the anchor rod, in order to in this way cause the expansion movement.

Figure 2:
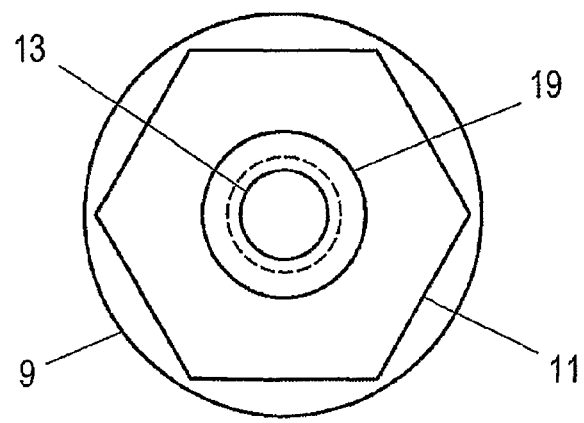
FIG. 2 a top view of this.

The inventive anchor nut 1, as shown in FIGS. 1 and 2, comprises an approximately hemispherical part 9, which faces the anchor plate 4, and a multi-sided shape 11, for example a square or a hexagonal shape. However, it is not mandatory to provide the hemispherical part 9 of the anchor nut 1.

In the anchor nut 1 a screw thread hole 13 is provided, wherein the screw thread of the screw thread hole 13 corresponds to the external screw thread of the anchor rod 3 only over part of its length. The screw thread hole 13 being uncovered at a rear end of the second region prior to installation of the anchor nut 1 on an externally threaded body. In particular, these screw threads are round screw threads. However, other screw thread types, for example metric screw threads etc., are also imaginable.

The screw thread in the screw thread hole 13 of the anchor nut 1 is not a through-thread; instead, it is a "finished" internal screw thread only in the region of the front of the anchor nut 1, in other words in the region of the hemispherical part 9, which internal screw thread corresponds to the external screw thread on the anchor rod 3. In the rear region 15 of the anchor nut 1, which rear region 15 is opposite part 9 (the front being the hemispherical part), the internal screw thread is not provided or is not finished. In this arrangement, in region 15 either no screw thread has been cut at all, or the screw thread has been partly cut. The region 15 that does not comprise a screw thread, or the region 15 that comprises a partly-cut screw thread only, can be provided in a projection 19 that projects beyond the external surface 17 of the anchor nut 1.

The procedure of using the anchor nut 1 according to the invention can be as follows:

After the drill hole 5 has been drilled in the ground 7, after one or several adhesive cartridges or the mortar cartridges (not shown) have been slid into the drill hole 5, and after the anchor rod 3 has been pushed in, said anchor rod 3 is rotated in order to open the mortar cartridge and to mix the mortar. This applies analogously to opening an adhesive cartridge and to mixing the adhesive, which as a rule is a two-component adhesive. Since due to the special design of the screw thread in it the anchor nut 1 can at first only be screwed along part of its length onto the anchor rod 3 (see FIG. 3), by means of a tool that is applied to the hexagonal region 11 of the anchor nut 1, the anchor rod 3 can be rotated in order to achieve the desired opening of the cartridge and mixing of the adhesive or of the mortar, or adjusting of the expansion body in longitudinal direction of the anchor rod 3.

In this arrangement the design of the screw thread with the two sections in the screw thread hole 13 of the anchor nut 1 can be selected so that the anchor nut 1 is not further screwed onto the anchor rod 3 until a predetermined torque is exceeded. This torque is, for example, selected to be 80 Nm.

As soon as this torque is exceeded, which is the case as soon as the adhesive or the mortar has cured or hardened, or as soon as expansion or spreading has taken place and the anchor rod 3 is firmly held, during continued rotation of the anchor nut 1 the region 15 of the hole 13 in the anchor nut 1, which region does not comprise a screw thread or comprises an unfinished screw thread, is formed so that a screw thread forms, and consequently the anchor nut 1 can be screwed further onto the anchor rod 3 until the anchor plate 4 rests against the ground 7, as shown in FIG. 4. Screwing the anchor nut 1 onto the external screw thread of the anchor rod 3 beyond the position according to FIG. 3 can take place with the tool with which the anchor rod 3 has previously been rotated over the anchor nut 1, in other words without changing the tool.

The invention provides an advantage in that the interior screw thread in the anchor nut is not completely finished. In this arrangement, during installation of the anchor, the end of the anchor rod 3 that projects out of the drill hole 5 comes to rest against the not yet completely produced region 15 of the screw thread in the anchor nut 1 (FIG. 3). After the adhesive or mortar by means of which the anchor rod 3 has been affixed in the drill hole has been cured or hardened, or after completion of expansion or spreading, the anchor rod 3 is also screwed into the non-finished region 15 of the screw thread of the anchor nut 1, wherein in the embodiment shown the projection 19 is deformed, by widening, on the face 17 of the anchor nut 1, which face is opposite the curved part 9. For example, as illustrated in FIG. 4, an outer circumferential surface of the projection 19 radially widens when the anchor rod 3 is screwed into the screw thread of the anchor nut 1. According to another example, the anchor rod 3 widens the part of the screw thread in the anchor nut 1, which part is smaller in diameter, and independently produces a screw thread in the region 15 that is not yet finished. If in the region 15 of the screw thread hole 13 at first no screw thread is provided, as soon as the anchor nut 1 is screwed (at increased torque) onto the anchor rod 3 that has been affixed in the drill hole so that it is non-rotational, a screw thread is also formed in the region 15, and the anchor nut 1 is screwed right into the position shown in FIG. 4.

Consequently, a complete anchor (rod, plate and nut) can be screwed into an adhesive cartridge (artificial resin cartridge) or mortar cartridge, and mixing of the adhesive (artificial resin) or of the mortar, or rotating of the anchor rod 3 can take place to operate an expansion body over the anchor nut 1 that has been screwed onto the outer end of the anchor rod 3. As a result of curing or hardening of the adhesive/mortar (with adhesive within a few seconds after mixing) or by spreading, the anchor rod 3 is affixed in the drill hole so that the anchor nut 1 then continues to rotate relative to the anchor rod 3, wherein the anchor rod 3 cuts or "finishes" the screw thread in the anchor nut 1, and thereafter the anchor plate 4 is affixed by means of the anchor nut 1. In this way, automatic installation is possible without the need to use different tools in order to rotate the anchor rod 3.

In summary, an exemplary embodiment of the invention can be described as follows:

An anchor comprises an anchor rod 3 which needs to be rotated during placement of the anchor, and further comprises an anchor plate 4 and an anchor nut 1. The screw thread in the anchor nut 1 matches the screw thread of the anchor rod 3 only over part of the screw thread hole 13. Thus the anchor nut 1 can only be screwed some way further onto the anchor rod 3, and up to a predetermined torque can be used for rotating the anchor rod during placement of the anchor. As soon as the anchor rod 3 is firmly seated in the drill hole, as a result of the action of adhesive, mortar or expansion or spreading, the anchor rod 3 forms a through-thread in the screw thread hole 13 when the anchor nut 1 is rotated relative to the anchor rod 3, and consequently the anchor nut 1 can finally be screwed onto the anchor rod 3 until it affixes the anchor plate 4 in its final position to the ground 7.

The invention claimed is:
1. An anchor nut, comprising:
a screw thread hole having a first region with a screw thread of a first diameter and a second region, the screw thread hole being uncovered at a rear end of the second region prior to installation of the anchor nut on an externally threaded body, the second region being one of:
   i) free of any screw thread, and
   ii) having a screw thread of a second diameter, the second diameter being reduced in size in comparison to the screw thread of the first diameter, wherein the second region is provided in a region of a ring that projects from a face of the anchor nut, the ring being provided on the face of the anchor nut opposite to an approximately hemispherical part of the anchor nut;

wherein the first and second regions of the anchor nut are constructed and arranged so that under a condition of an entirety of the first region being threaded onto the externally threaded body having a thread corresponding to the thread of the first region, continued rotation of the anchor nut results in the second region being pulled over the externally threaded body so that the externally threaded body penetrates the second region, causing the projecting ring to deform by radially widening at least an outer circumferential surface of the projecting ring from the face of the anchor nut, the first and second regions remaining attached to one another, and wherein the screw thread hole remains uncovered at the rear end of the second region provided in the ring opposite the face of the anchor nut during the threading.

2. The anchor according to claim 1, wherein an internal diameter of the second region being thread free equals an internal diameter of the first region.

3. The anchor nut according to claim 1 wherein the approximately hemispherical part is provided at a distal front end portion of the nut and wherein the anchor nut includes an anchor nut body having an external multi-sided polygonal shape and wherein the ring has an external diameter less than a diameter of the approximately hemispherical part and less than a largest outer dimension of the polygonal anchor nut body.

4. An anchor comprising:
an anchor rod;
an anchor plate; and
an anchor nut comprising a screw thread hole having a first region with a screw thread of a first diameter and a second region, the screw thread hole being uncovered at a rear end of the second region, the second region prior to installation of the anchor nut on the anchor rod being one of:
i) free of any screw thread, and
ii) having a screw thread of a second diameter, the second diameter being reduced in size in comparison to the screw thread of the first diameter,
wherein the second region is provided in a region of a ring that projects from a face of the anchor nut,
wherein a size of the first screw thread corresponds to an external screw thread of the anchor rod, and wherein the second region of the screw thread hole, which is one of free of any screw thread and having the screw thread with the reduced diameter, is provided in the anchor nut on a face of the anchor nut opposite to a hemispherical part of said anchor nut;
wherein the first and second regions of the anchor nut are constructed and arranged so that under a condition of an entirety of the first region being threaded onto the anchor rod, continued rotation of the anchor nut results in the second region being pulled over the anchor rod so that the anchor rod penetrates the second region, causing the projecting ring to deform by radially widening at least an outer circumferential surface of the projecting ring from the face of the anchor nut the first and second regions remaining attached to one another, and wherein the screw thread hole remains uncovered at the rear end of the second region provided in the ring opposite the face of the anchor nut during the threading.

5. The anchor according to claim 4, wherein an internal diameter of the second region being thread free equals an internal diameter of the first region.

6. The anchor of claim 4 wherein the approximately hemispherical part is provided at a front end portion of the nut facing the anchor plate and wherein the anchor nut includes an anchor nut body having an external multi-sided polygonal shape and wherein the second region has an external dimension less than a diameter of the approximately hemispherical part and less than a largest outer dimension of the anchor nut body.

7. An anchor nut, comprising:
a nut body with a first nut face facing a direction of nut advancement and a second rear nut face opposite the first nut face;
a ring region projecting from the second nut face;
a hole having a length and extending through the ring region projecting from the second nut face and extending into the nut body;
a first region along a first portion of the length of the hole having a first internal screw thread of a first diameter; and
a second region within the ring region, the hole being uncovered at a rear end of the second region opposite the second nut face prior to installation of the anchor nut on an externally threaded body;
the second region being one of:
i) free of any internal screw thread, and
ii) comprising an internal screw thread of a second diameter, the second diameter being less than the first diameter;
wherein the first and second regions of the anchor nut are constructed and arranged so that under a condition of an entirety of the first region being threaded onto the externally threaded body having a thread corresponding to the thread of the first region, continued rotation of the anchor nut in the direction of nut advancement results in the ring region being pulled over the externally threaded body so that the externally threaded body penetrates the ring region, causing the projecting ring region to deform by radially widening at least an outer circumferential surface of the projecting ring region from the face of the anchor nut, the nut body and the ring region remaining attached to one another, and
wherein the hole remains uncovered at the rear end of the second region provided in the ring opposite the second nut face during the threading.

8. The anchor nut of claim 7 wherein the nut body has a multi-sided polygonal shape and the ring region has an external diameter less than a largest outer dimension of the nut body.

* * * * *